US012138205B2

(12) United States Patent
Reinkensmeyer et al.

(10) Patent No.: US 12,138,205 B2
(45) Date of Patent: Nov. 12, 2024

(54) WHEELCHAIR ARM REST DEVICE

(71) Applicant: The Regents of the University of California, Oakland, CA (US)

(72) Inventors: David Reinkensmeyer, Irvine, CA (US); Daniel Zondervan, Irvine, CA (US); Marti Comellas Andres, Irvine, CA (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 651 days.

(21) Appl. No.: 17/383,113

(22) Filed: Jul. 22, 2021

(65) Prior Publication Data

US 2022/0023119 A1 Jan. 27, 2022

Related U.S. Application Data

(60) Provisional application No. 63/054,900, filed on Jul. 22, 2020.

(51) Int. Cl.
*A61G 5/04* (2013.01)
*A61G 5/12* (2006.01)

(52) U.S. Cl.
CPC ............. *A61G 5/045* (2013.01); *A61G 5/125* (2016.11); *A61G 2203/14* (2013.01)

(58) Field of Classification Search
CPC ..... A61G 5/045; A61G 5/125; A61G 2203/14
See application file for complete search history.

(56) References Cited

U.S. PATENT DOCUMENTS

| | | | | |
|---|---|---|---|---|
| 6,113,562 A * | 9/2000 | Bonutti | A61F 5/013 | 602/5 |
| 9,375,325 B2 * | 6/2016 | Garrec | A61F 2/70 | |
| 11,013,956 B2 * | 5/2021 | Hyung Jung | A63B 21/00178 | |
| 2007/0060445 A1 * | 3/2007 | Reinkensmeyer | A61B 5/4528 | 601/1 |
| 2007/0219069 A1 * | 9/2007 | Nativ | A61G 7/1051 | 482/69 |
| 2015/0190292 A1 * | 7/2015 | Robins | A61G 5/021 | 180/336 |

* cited by examiner

*Primary Examiner* — Jacob D Knutson
(74) *Attorney, Agent, or Firm* — Thomas | Horstemeyer, LLP

(57) ABSTRACT

In one embodiment, a wheelchair device includes a frame adapted to be removably mounted to a wheelchair, a slide member supported by the frame that is configured to be pushed in a forward direction away from a user of the device with the user's arm, a transmission mechanism including a rotatable reel and a spring associated with the reel that resists rotation of the reel in a first direction and assists rotation of the reel in a second direction, and a cable having first and second ends, the first end of the cable being attached to the slide member and the second end being attached to the rotatable reel. With such a configuration, movement of the slide member in the forward direction causes the rotatable reel to rotate in the first direction and movement of the slide member in a backward direction opposite to the forward direction causes the rotatable reel to rotate in the second direction.

20 Claims, 8 Drawing Sheets

WHEELCHAIR ARM REST DEVICE

CROSS-REFERENCE TO RELATED APPLICATION

This application claims priority to U.S. Provisional Application Ser. No. 63/054,900, filed Jul. 22, 2020, which is hereby incorporated by reference herein in its entirety.

NOTICE OF GOVERNMENT-SPONSORED RESEARCH

This invention was made with Government support under grant/contract numbers R44HD082882 and R44HD097803, awarded by the Eunice Kennedy Shriver National Institute of Child Health and Human Development (NICHD). The Government has certain rights in the invention.

BACKGROUND

One in six people will experience a stroke in their lifetime and over half of them will incur chronic upper extremity (UE) movement impairment. While intensive rehabilitation reduces impairment, most individuals do not undertake enough movement practice, especially during the time early after stroke in which the brain is in a heightened period of plasticity. Individuals who have one or more very weak UEs often fall into this category as such movement practice can be especially difficult and frustrating for them. This is unfortunate as recent evidence suggests that those are the very individuals who could benefit most from intensive UE movement training.

Although a variety of technological innovations have been developed over the years to facilitate UE rehabilitation after stroke, there remains an unsolved need for easily accessible and effective technology for UE movement training, particularly for severely impaired individuals. Furthermore, as stays in formal rehabilitation settings trend shorter, it would be beneficial if such a technology could both be used in medical contexts (e.g., hospitals, rehabilitation facilities, etc.) as well as outside of such contexts, as in the individual's home.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
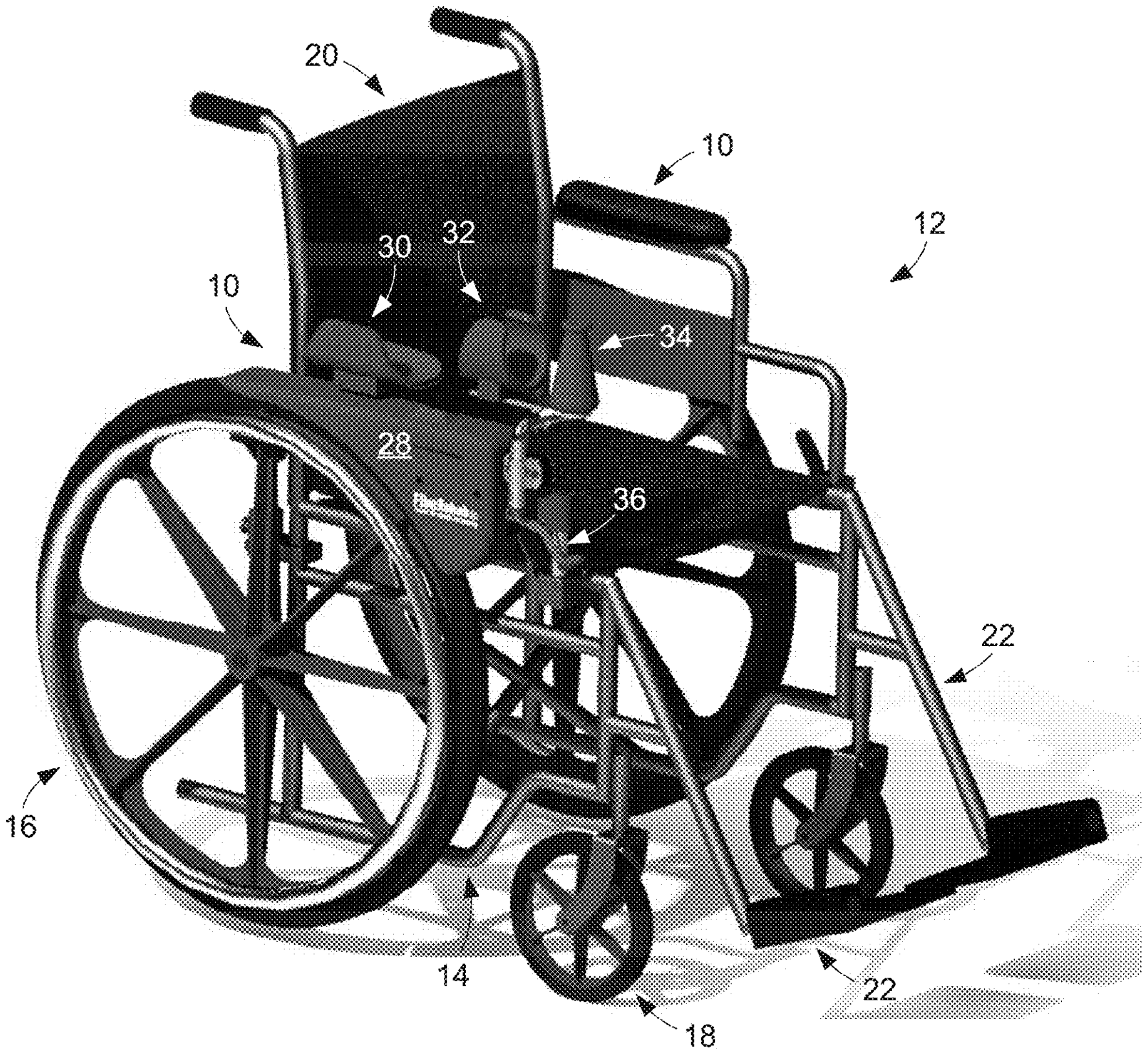
FIG. 1 is a perspective view of an embodiment of a wheelchair device in accordance with this disclosure, the device shown attached to a mechanical wheelchair.
Figure 2A:
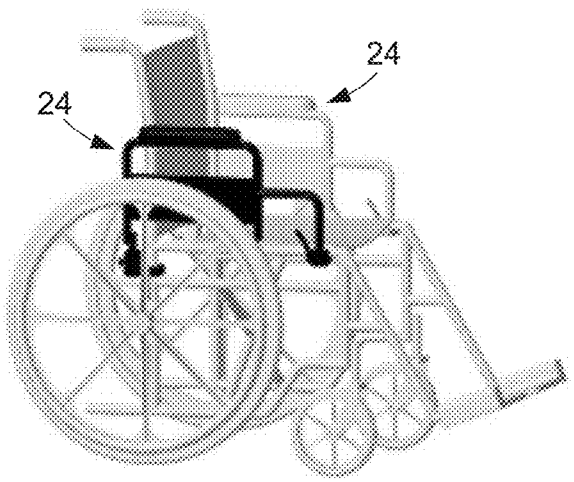
FIGS. 2A-2D are sequential views that illustrate replacement of an armrest of a wheelchair with the wheelchair device shown in FIG. 1.
Figure 2B:
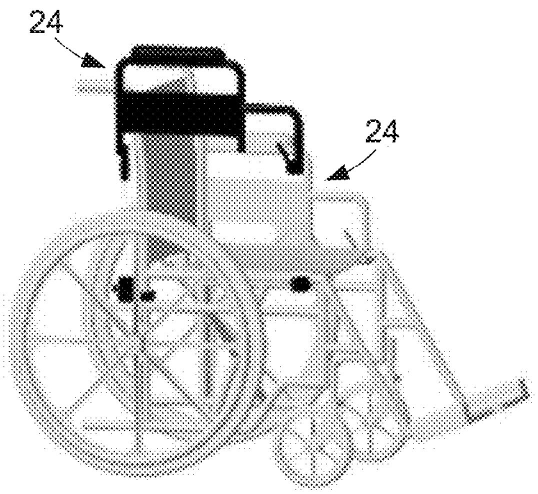
Figure 2C:
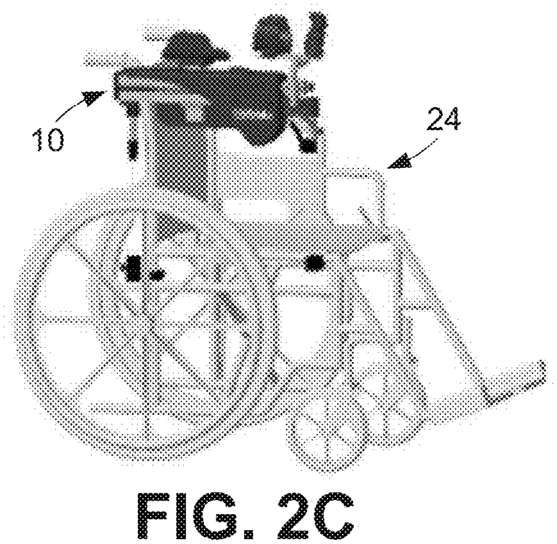
Figure 2D:
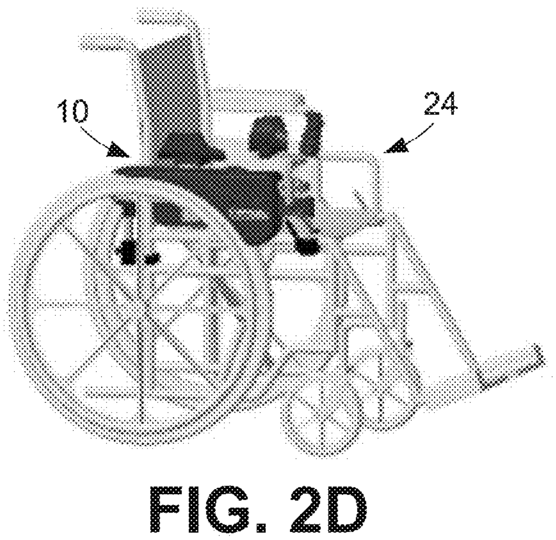

As described above, it can be appreciated that there is a need for an easily accessible and effective technology for upper extremity (UE) movement training, particularly for severely impaired individuals, that can be used in both at medical facilities and outside of such facilities, such as within the individual's home. Disclosed herein are embodiments of such a technology. In particular, disclosed are devices that can be attached to a conventional mechanical wheelchair and enable the wheelchair user, such as a stroke patient, to perform UE movement training. In some embodiments, the device enables the user to practice moving his or her hand forward and backward along a linear path, which requires the user to activate and control the muscles of his or her UE. In some embodiments, the device is configured to replace a conventional armrest of the wheelchair and, like such armrests, can be secured in place using one or more quick-release fasteners. Although the device is configured to facilitate UE movement training, it is noted that, in some embodiments, the device can additionally or in exception be used to propel the wheelchair. In such cases, such propulsion is possible even for individuals with weak UEs.

In the following disclosure, various specific embodiments are described. It is to be understood that those embodiments are example implementations of the disclosed inventions and that alternative embodiments are possible. Such alternative embodiments include hybrid embodiments that comprise features from different disclosed embodiments. It is further noted that embodiments of the disclosed invention can include embodiments that do not comprise all of the details set forth in the following description or illustrated in the drawings and such embodiments are capable of being practiced or carried out in various ways. All such embodiments are intended to fall within the scope of this disclosure.

FIG. 1 illustrates an embodiment of a wheelchair device 10 that can be used for UE movement training as well as wheelchair propulsion. As is apparent from the figure, the device 10 is shown mounted to a mechanical wheelchair 12 that, like most such wheelchairs, includes a frame 14 to which relatively large rear wheels 16 and relatively small front wheels 18 are mounted. The rear wheels 16 are mounted to an axle that enables the wheels to spin freely. The front wheels 18 are caster-style wheels and, therefore, are capable of freely spinning about axes to which they are directly mounted as well as pivot about a vertical axle to which the wheels are indirectly mounted. Also mounted to the frame 12 is a seat 20, leg and foot supports 22, and a removable armrest 24.

In the illustrated embodiment, the right-side armrest of the wheelchair 12 has been removed from the wheelchair 12 and has been replaced by the wheelchair device 10. As the wheelchair device 10 is mounted to the right side of the wheelchair 12, the wheelchair device is configured for use by the wheelchair user's right hand and arm and can be designated a right-side wheelchair device. Although only a right-side wheelchair device 10 is shown in FIG. 1, it is noted that a wheelchair device of the type depicted in the figure can be provided on the left side, the right side, or both sides of the wheelchair 12 so that the wheelchair user can perform UE movement training and/or wheelchair propulsion using the left arm, the right arm, or both arms. Irrespective of what side of the wheelchair 12 the device 10 is mounted, such mounting can be achieved by simply releasing mounting elements 26 (see FIG. 3) provided on the frame 14 of the wheelchair that are configured to receive spaced vertical support tubes of the armrest, removing the tubes from the mounting elements to free the armrest from the wheelchair, inserting similarly configured and positioned vertical support tubes of the device (see discussion of FIG. 3 below), and reattaching the armrest mounting elements. FIGS. 2A-2D sequentially illustrate this process. In cases in which the mounting elements 26 incorporate a quick-release feature (e.g., a quick-release fastener) one or both armrests of the wheelchair 12 can be replaced with a device 10 in a matter of seconds.

The wheelchair device 10 includes an outer housing 28 that covers and contains various internal components of the device that enable it to function, an elbow support 30 that is configured to support the user's elbow and that, in some embodiments, prevents shoulder abduction, a forearm or wrist support 32 that is configured to support the user's forearm or wrist, and a hand interface 34, such as a handgrip, that is configured to be interfaced (e.g., gripped) by the user's hand. Also visible in FIG. 1 is a mode selection element 36 that, as described below, can be placed in a first orientation in which the device 10 can be used in a first, stationary (or UE movement training only) mode in which the device can be used for UE movement training without propelling the wheelchair 12, or a second orientation in which the device can be used in a propulsion mode in which the device can be used to propel the wheelchair forward (as well as provide UE movement training) using a transmission mechanism contained within the housing 28.

Figure 3:
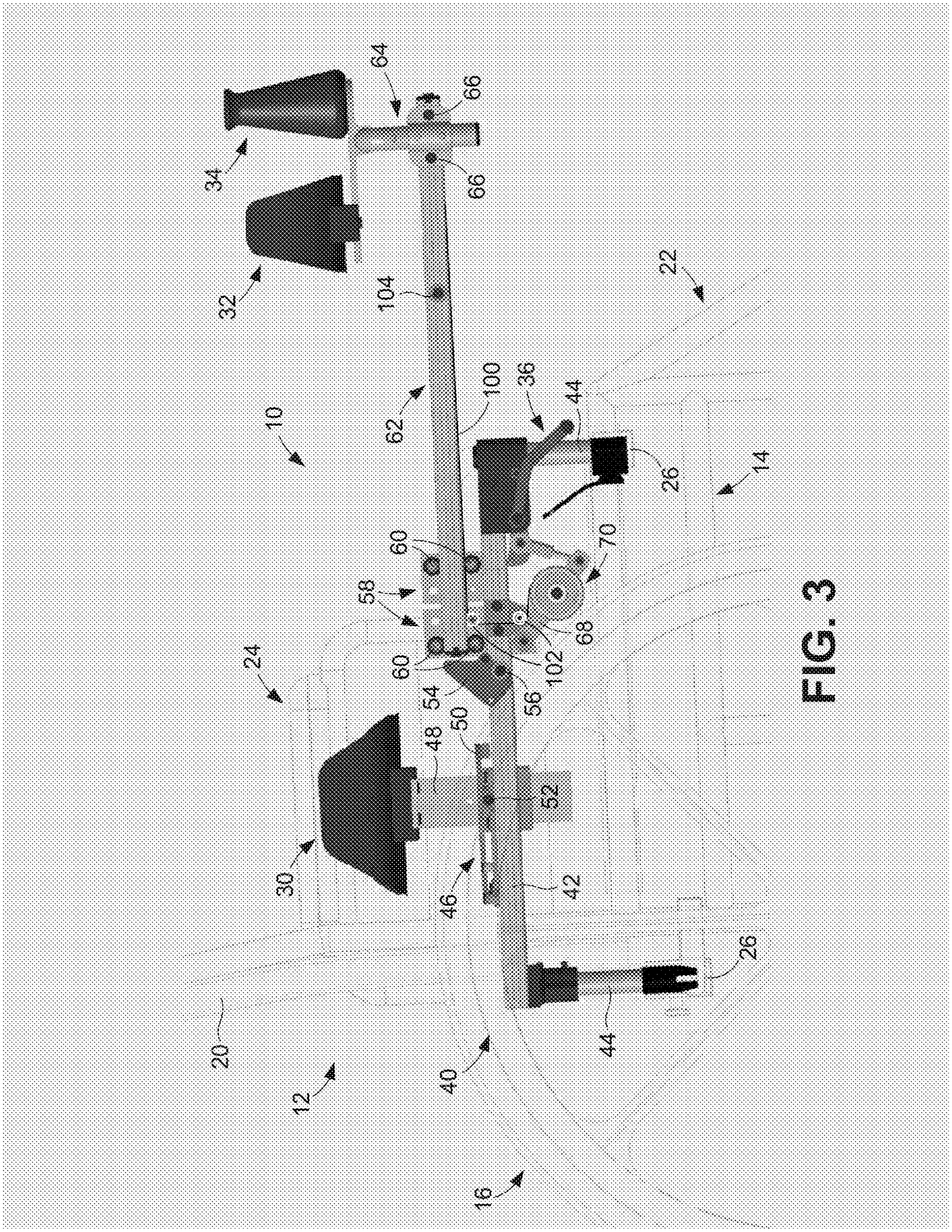
FIG. 3 is a side view of an embodiment of the wheelchair device shown in FIG. 1 that illustrates operation of the device when in a stationary mode.
Figure 4:
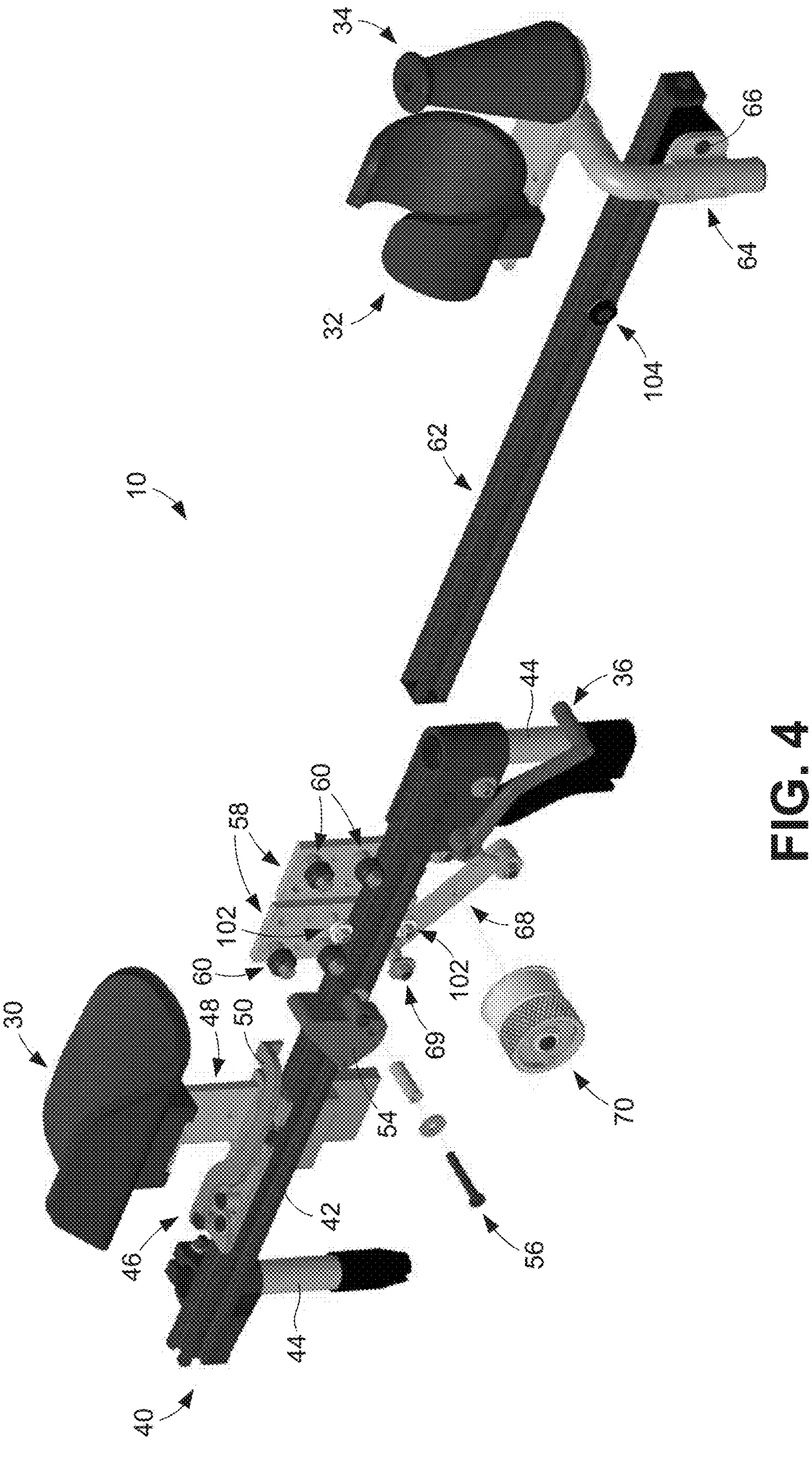
FIG. 4 is a side perspective view of the wheelchair device shown in FIG. 1, with a slide member of the device shown separated from the remainder of the device.

FIG. 3 is a side view of the wheelchair device 10 as attached to the wheelchair 12 (which is shown in phantom) with the outer housing 28 removed and FIG. 4 is an exploded perspective view of the device (again without the housing) that more clearly shows individual components of the device. As illustrated in FIG. 3, the device 10 comprises a frame 40 that includes a horizontal support member 42 that is supported by and mounted to the wheelchair frame 12 with vertical support elements 44, such as tubes, that extend downward from the member and, as described above, are configured to be received by the armrest mounting elements 26 provided on the frame. With reference to both FIGS. 3 and 4, fixedly mounted to the support member 42 with a mounting element 46 is a further vertical support element 48 to which the elbow support 30 is mounted. In some embodiments, the height of the elbow support 30 can be adjusted by pivoting a lever 50 provided on the mounting element 46 to remove a pin 52 that extends through one of multiple holes in the support element 48, repositioning the height of the support element to a desired location, and returning the lever 50 back to its original position and passing the pin through a different hole.

Also fixedly mounted to the horizontal support member 42 is a pivotable brake 54 that, as described below, slows or halts rotation of the rear wheel 16 of the wheelchair 12 when a slide member is pulled backward into engagement with the brake. In cases such as that shown in FIG. 4, the brake 54 is pivotably secured to the support member 42 using a threaded fastener 56.

With further reference to FIGS. 3 and 4, the wheelchair device 10 also comprises one or more mounting plates 58 that can also be fixedly mounted to the horizontal support member 42 with threaded fasteners (not visible in the figures). The one or more mounting plates 58 include roller guides 60 that support and enable forward and backward linear movement of a slide member 62. In the illustrated embodiment, four roller guides 60 are provided, including two upper roller guides and two lower roller guides. Mounted to a distal end of the slide member 62 (from the perspective of the wheelchair user while seated in the wheelchair 12) are the wrist support 32 and the hand interface 34. More particularly, the wrist support 32 and hand interface 34 are mounted to a further vertical support element 64 that is fixedly secured to the slide member 62 with further threaded fasteners 66. Also mounted to the one or more mounting plates 58 is a pivotable arm 68 that can pivot about its mounting or pivot point 69 to enable the wheelchair device 10 to be toggled between the stationary mode and the propulsion mode. Mounted to the arm 68 is a transmission mechanism 70 that is used in both the stationary and propulsion modes.

Figure 5:
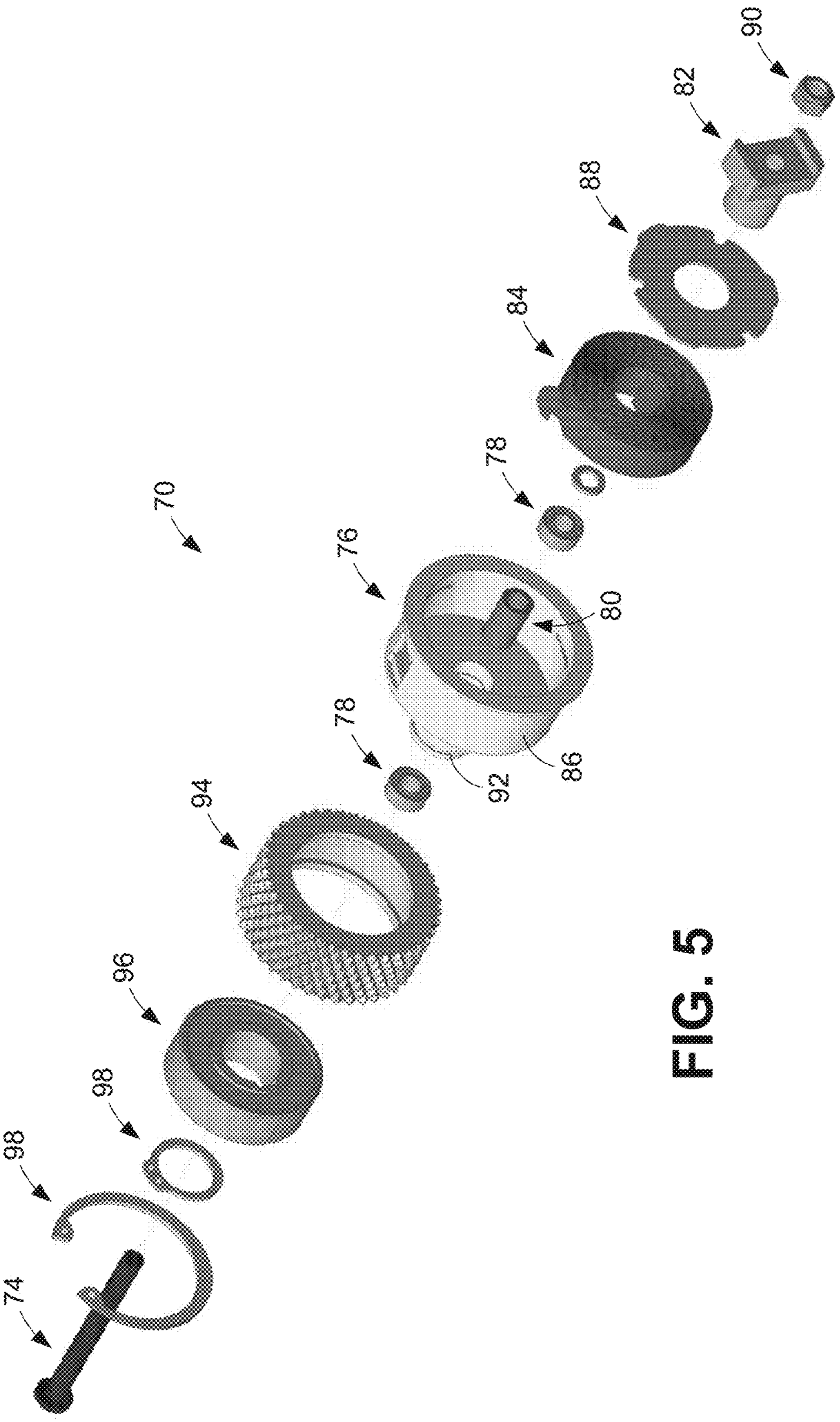
FIG. 5 is an exploded perspective view of an embodiment of a transmission mechanism of the wheelchair device shown in FIG. 1.
Figure 6:
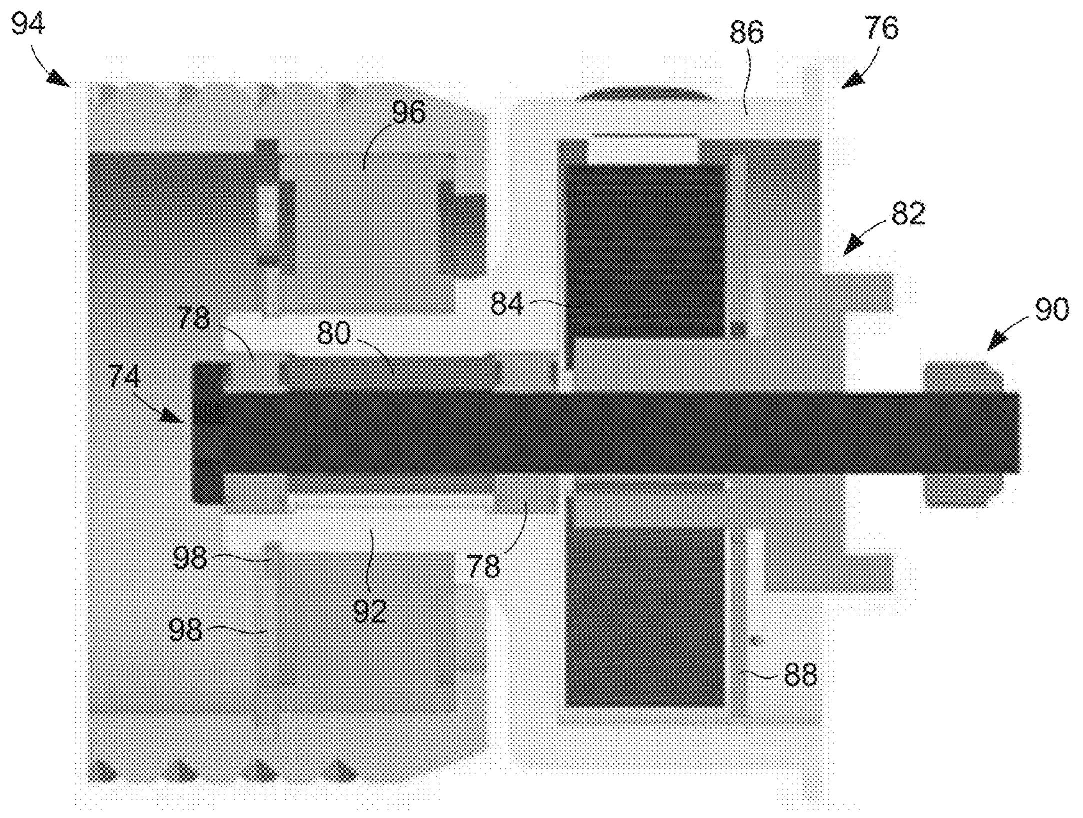
FIG. 6 is a side cross-sectional view of the transmission mechanism of FIG. 5.

An example configuration for the transmission mechanism 70 is shown in FIGS. 5 and 6, with FIG. 5 depicting the mechanism in an exploded perspective view and FIG. 6 depicting the mechanism in cross-section in its assembled state. As illustrated in those figures, the mechanism 70 includes an axle 74 on which a rotatable reel 76 is rotatably mounted with one or more roller bearings 78, which can be separated by a spacer 80. Also mounted to the axle 74 is a spring hub 82 on which a torsion spring 84 is wound. The hub 82 and the spring 84 are received within an interior space defined by a body 86 of the reel 76 and a first, inner end of the spring is attached to the hub while a second, outer end of the spring is attached to the reel so that, as described below, the spring biases the reel toward one direction of rotation and provides resistance against an opposite direction of rotation. A cover 88 can be provided over the exposed portion of the spring 84, and both the spring and hub 82 can be retained in place within the reel 76 with a threaded fastener 90 that threads onto the axle 74.

As is most clearly shown in FIG. 6, the reel 74 includes its own hub 92 that extends from the body 86. A drive wheel 94 used in the propulsion mode of the wheelchair device 10 is mounted on that hub 92 with a one-way bearing 96, which is provided within an interior space defined by the drive wheel and is secured to the reel 74 with retainer rings 98. As described below, the one-way bearing 96 is configured such that the drive wheel 94 rotates in unison with the reel 76 in a first direction of rotation but can remain stationary or independently rotate when the reel rotates in a second, opposite direction.

Referring back to FIG. 3, the wheelchair device 10 further includes a cable 100 that is attached at a first end to the slide member 62 and attached at a second end to the rotatable reel 76. In some embodiments, the first end of the cable 100 attaches to the slide member 62 at a point near the distal end of the member close to where the wrist support 32 is located. The cable 100 extends from that attachment point, wraps around one or more pulleys 102 mounted to the one or more mounting plates 58, and further wraps around the outer periphery of the body 86 of the reel 76 through multiple turns. With such a configuration, forward linear movement of the slide member 62 moves the first end of the cable 100 away from the transmission mechanism 70, which causes the reel 76 to rotate in a first, backward direction (counterclockwise in the example of FIG. 3) as a portion of the cable is unwound from the reel. Notably, the torsion spring 84 mounted within the reel 76 resists (i.e., applies a resistive force) to this backward rotation. In contrast, backward linear movement of the slide member 62 moves the first end of the cable 100 closer to the transmission mechanism 70, which enables the torsion spring to rotate the reel 76 in a second, forward direction (clockwise in the example of FIG. 3) to maintain tension on the cable and rewind it onto the reel.

Figure 7A:
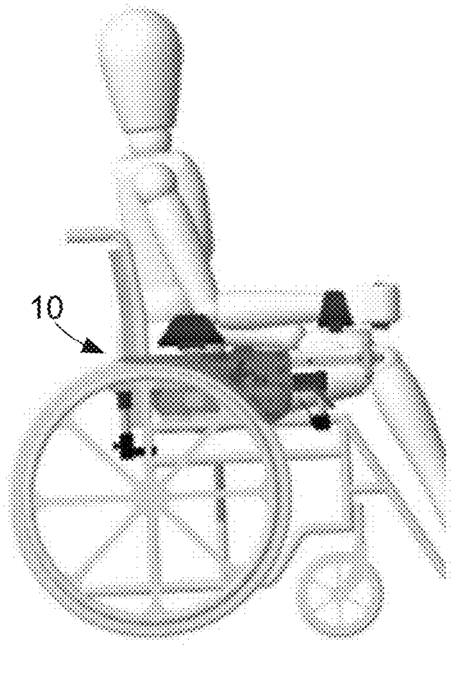
FIGS. 7A and 7B are sequential views illustrating an embodiment of use of the wheelchair device shown in FIG. 1.
Figure 7B:
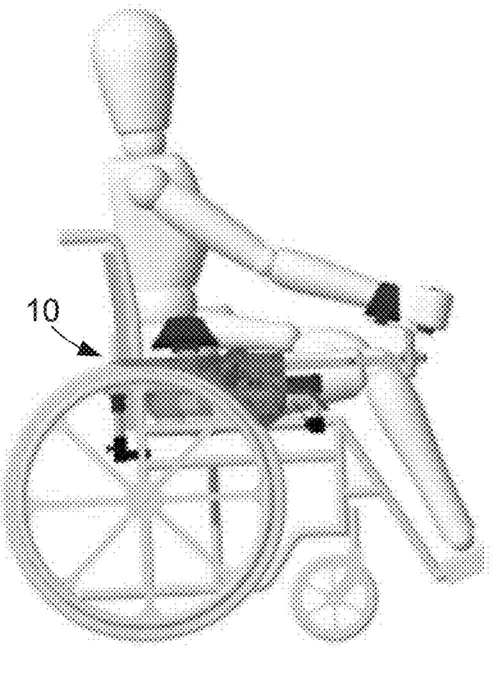

The above-described functionality of the slide member 62, transmission mechanism 70, and cable 100 can be used to facilitate UE movement training in the above-mentioned stationary mode of the device. In particular, when seated within the wheelchair 12, the user can, either independently or with assistance, place his or her wrist on the wrist support 32 and his or her hand around the hand interface 34, as shown in FIG. 7A. The user can then push the slide member 62 forward, away from him- or herself, with the user's hand and arm. As the slide member 62 is moved forward guided by the roller guides 60, the reel 76 is rotated in the backward (counter-clockwise) direction against the force applied by the torsion spring 84 of the transmission mechanism 70, which provides therapeutic resistance and, therefore, UE movement training, to the user. The user can move the slide member 62 forward until either achieving full extension of the arm, as illustrated in FIG. 7B, or to the point at which the user can no further extend his or her arm. At that point, the user can then pull the slide member 62 backward, which moves the first end of the cable 100 toward the transmission mechanism 70 and enables the torsion spring 84 to rotate the reel 76 in the forward (clockwise) direction to maintain tension on the cable and rewind it back onto the reel. In addition, the spring 84 provides assistive force that can help the user return the slide member 62 to the initial position shown in FIG. 7A.

As mentioned above, the wheelchair device 10 can also be used in a propulsion mode with which the wheelchair user, even those with weak UEs, can propel the wheelchair 12 forward. To transition the device 10 from the stationary mode to the propulsion mode, the mode selection element 36 first identified in relation to FIG. 1 and more clearly shown in FIG. 3 is toggled from one orientation to another. In embodiments such as that shown in FIG. 3 in which the mode selection element 36 is configured as a mode selection lever, the lever can be pivoted from a first, upper orientation shown in FIG. 3 to a second, lower orientation in which the lever pivots the pivotable arm 68 downward so as to place the drive wheel 94 into firm engagement with the outer periphery of the rear wheel 16 of the wheelchair 12. When the drive wheel 94 is engaged with the rear wheel 16, backward rotation (counter-clockwise in FIG. 3) causes forward rotation (clockwise in FIG. 3) of the rear wheel so as to propel the wheelchair 12 forward. Such forward propulsion occurs when the wheelchair user pushes the slide member 62 forward. In particular, when the slide member 62 is moved forward, the reel 76 is rotated in the backward (counter-clockwise) direction as described above and the one-way bearing 96 within the drive wheel 94 causes the drive wheel to rotate backward in unison with the reel. This backward rotation of the drive wheel 94 causes forward rotation of the wheelchair rear wheel 16. When the slide member 62 moves backward, however, the one-way bearing 96 enables the drive wheel 94 to rotate independently of the reel 76 so that the drive wheel does not interfere with continued forward rotation of the rear wheel 16 of the wheelchair 12.

When the slide member 62 is pulled backward, either because of the user's backward stroke, the assistive force of the torsion spring 84, or both, until a stop element 104 mounted to the slide member near the distal end of the member firmly engages the pivotable brake 54, the stop element causes the brake to pivot backward until it firmly engages the outer periphery of the rear wheel 16, thereby applying a braking force to the wheel that slows or halts rotation of the wheel. Therefore, the user can propel the wheelchair 12 forward by alternately pushing and pulling the slide member 62 forward and backward without pulling the member backward to the extent at which the brake is engaged. When the user wishes to slow or stop forward motion of the wheelchair, however, the user can pull the slide member 62 until the stop element 104 engages the brake 54. In some embodiments, the force of the torsion spring 84 will be enough to engage the brake 54 and halt travel the wheelchair 12 on its own. As with most brakes, the amount of force applied to the brake 54 with the stop element 104 dictates the amount of braking force that is applied to the wheel 16. In some embodiments, the brake 54 is spring loaded so that it is kept out of contact with the wheel 16 when it is not being pressed into contact with the wheel by the stop element 104.

Notably, the braking functionality provided by the brake 54 and the stop element 104 of the slide member 62 can be especially useful when the wheelchair user is propelling the wheelchair uphill. In particular, the user can alternately push the slide member 62 (or two slide members, one associated with each rear wheel 16) forward and pull the slide member backward to engage the brake to prevent rearward travel of the wheelchair down a grade or hill under the force of gravity between each forward stroke so that forward progress is not lost between each forward stroke. In addition to preventing backward progress of the wheelchair 12 while climbing a grade or hill, this feature further ensures greater safety for the wheelchair user as it avoids uncontrolled backward rolling of the wheelchair. As noted above, in some embodiments, the force of the torsion spring 84 will be enough to engage the brake 54 and halt travel the wheelchair 12 on its own, which is especially useful in cases in which the wheelchair 12 is being propelled uphill and the user has weak UEs.

The above-disclosed wheelchair device shifts current rehabilitation practice paradigms in at least five ways. First, the device's arm support system improves positioning and support of the upper extremity while using a wheelchair. Second, the device provides a more motivating therapy than the current alternatives for individuals with moderate to severe arm impairment while they recover in medical facilities or at home. Third, the device is expected to improve outcomes compared to current alternatives by increasing functionally relevant arm activity. Fourth, the device has a high likelihood of shifting current clinical practice because it can be easily integrated into the current rehabilitation workflow and continuum of care. Fifth, the device can include a remote patient monitoring portal to track user performance, increase adherence, and help individualize home exercise and activity goals.

Figure 8A:
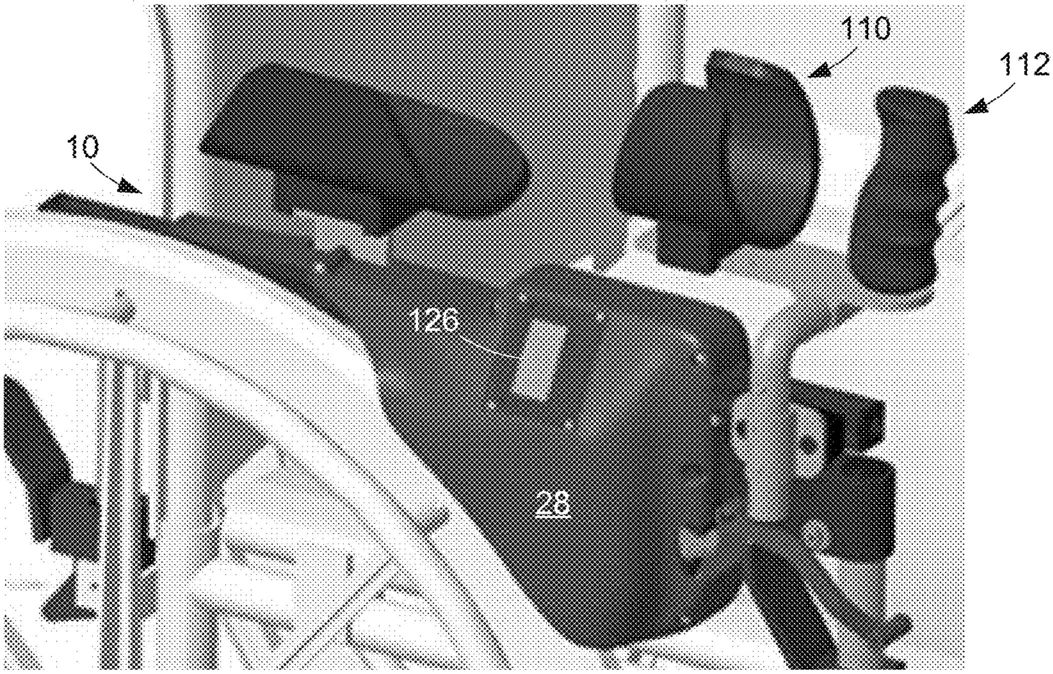
FIGS. 8A-8D are perspective views of an embodiment of a wheelchair device that depict alternative user interfaces that can be provided on the device.
Figure 8B:
Figure 8C:
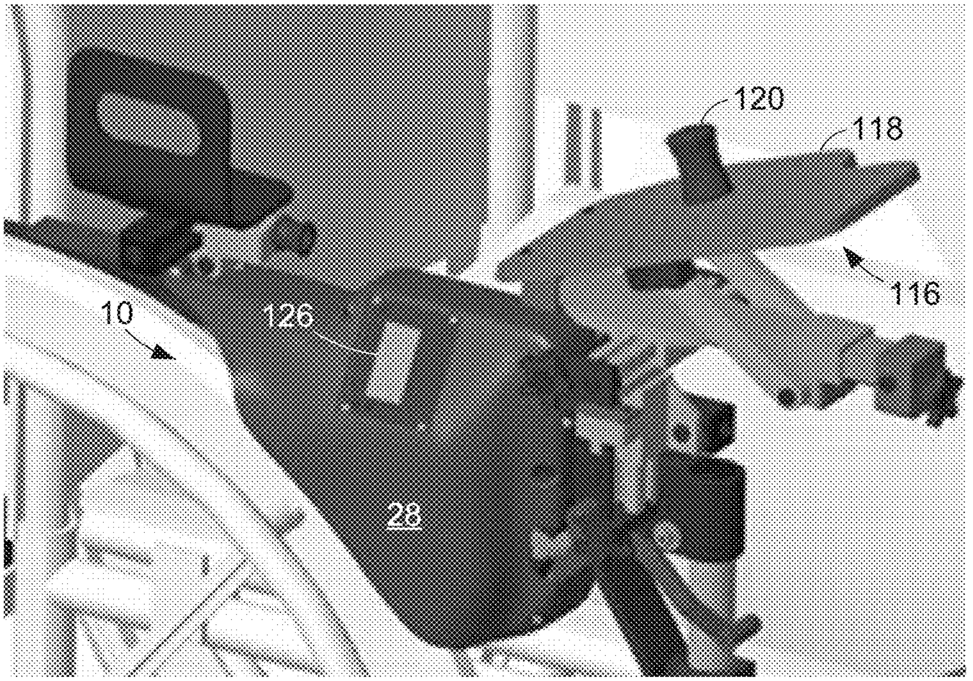
Figure 8D:
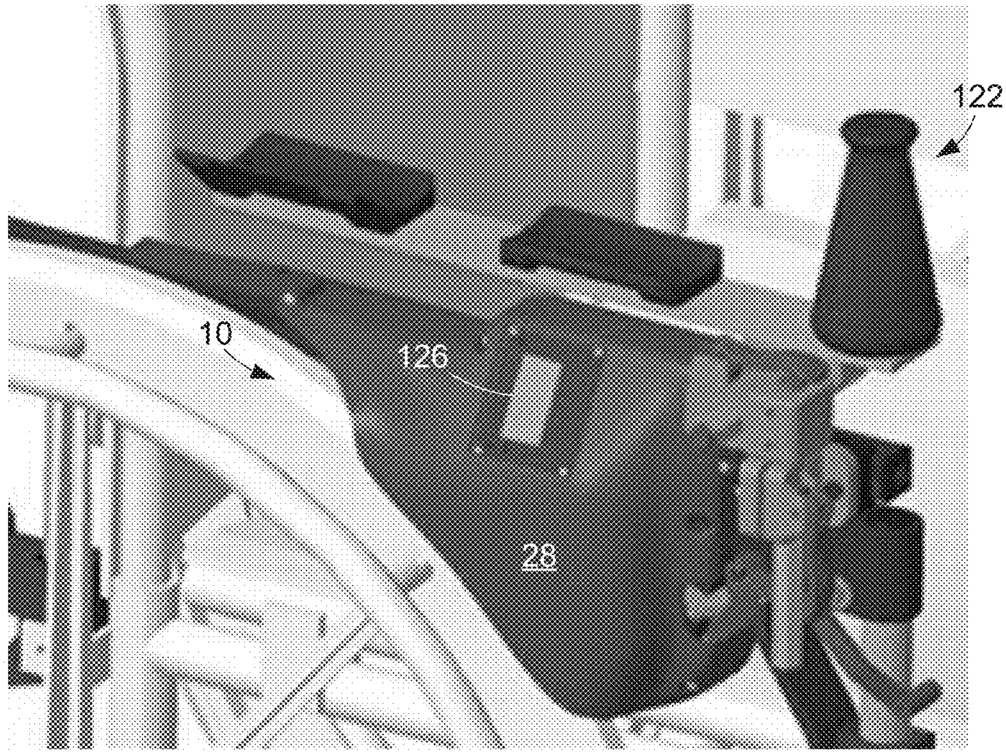

It is further noted that the disclosed wheelchair device can incorporate a variety of forearm and/or wrist supports as well as a variety of hand interfaces. Examples of this are illustrated in FIGS. 8A-8D. FIG. 8A shows a configuration similar to that shown in FIG. 1 in which a curved wrist support 110 and a vertical handgrip 112 are provided. FIG. 8B shows a configuration in which a handgrip 114 is provided that can pivot within a predetermined angular range about a horizontal axis (both toward and away from the leg) to enable forearm rotation. FIG. 8C shows a configuration in which a three-degree-of-freedom device 116 is provided that comprises a planar platform 118 and a knob 120 that extends upwardly from the platform. FIG. 8D shows a further example of a vertical handgrip 122.

The disclosed wheelchair device 10 can further comprise electronics configured to log UE movements, measure range of motion, and upload user data. For example, the wheelchair device 10 can include a potentiometer or a magnetic encoder or other rotational or linear sensor to measure or sense how much the drive wheel rotates or how far the slide member is pushed forward from its baseline position. This would enable therapists to set a target range of motion for each individual user and create a threshold for what is considered a beneficial/effortful exercise "repetition." In some embodiments, the device 10 can identify and count discrete UE movements using a threshold filter at this target set point applied to the voltage output of the potentiometer. The wheelchair device 10 can also include a binary sensor associated with the mode selector element that enables a microcontroller to differentiate between stationary and propulsion UE movements. In some embodiments, the electronics can further include a low-power microcontroller (e.g., nRF52 by Nordic), a user-facing display, such as a liquid crystal display (LCD) 126 shown in FIGS. 8A-8D, to provide quantitative feedback, a real-time clock to timestamp data, and a transceiver (e.g., a Multi-IMSI Super SIM cellular radio chipset from Twilio) to send data to a remote monitoring portal (e.g., a HIPAA-compliant computing device that receives and stores exercise data). A computing device can be used to validate the device's remote monitoring features.

A monitoring portal can also be provided that supports one or more network pages, including a web-based frontend user interface that enables clinicians to remotely monitor their patients' exercise with their wheelchair devices. In some embodiments, one of the network pages can be a dashboard screen that lists all of the users associated with the clinician's account. In such a case, the clinicians can have the option to label each user with a unique ID code rather than a patient's name to reduce the risk to the user's privacy. Clinicians can further access a user-detail screen for all listed users, which can present graphs of stationary and propulsion repetitions completed with the wheelchair device for each patient by day, week, or month, which enables the clinicians to adjust exercise parameters (e.g., target number of repetitions per day).

The invention claimed is:

1. A wheelchair device comprising:

a frame adapted to be removably mounted to a wheelchair;

a slide member supported by the frame that is configured to be pushed in a forward direction away from a user of the device with the user's arm;

a transmission mechanism including a rotatable reel and a spring associated with the reel that resists rotation of the reel in a first direction and assists rotation of the reel in a second direction; and a cable having first and second ends, the first end of the cable being attached to the slide member and the second end being attached to the rotatable reel;

wherein movement of the slide member in the forward direction causes the rotatable reel to rotate in the first direction and wherein movement of the slide member in a backward direction opposite to the forward direction causes the rotatable reel to rotate in the second direction.

2. The wheelchair device of claim 1, wherein the cable wraps around an outer periphery of a body of the rotatable reel through multiple turns and wherein rotation of the reel in the first direction unwinds the cable off the reel body and rotation of the reel body in the second direction rewinds the cable on the reel body.

3. The wheelchair device of claim 1, wherein the transmission mechanism further includes a spring hub and wherein the spring is a torsion spring that is wound around the hub and has a first end attached to the hub and a second end attached to the reel.

4. The wheelchair device of claim 3, wherein the transmission mechanism further includes an axle upon which the rotatable reel is mounted with roller bearings.

5. The wheelchair device of claim 1, further comprising two or more roller guides mounted to the frame that support the slide member and facilitate the forward and backward movement of the slide member.

6. The wheelchair device of claim 1, further comprising a hand interface mounted to the slide member with which the user can push the slide member in the forward direction.

7. The wheelchair device of claim 6, wherein the hand interface is configured as a handgrip configured to be gripped by the user's hand.

8. The wheelchair device of claim 7, wherein the handgrip is configured to pivot about a horizontal axis so that the user can rotate his or her forearm while gripping the handgrip.

9. The wheelchair device of claim 1, further comprising an elbow support mounted to the frame that is configured to support the user's elbow.

10. The wheelchair device of claim 1, further comprising a forearm or wrist support mounted to the slide member that is configured to support the user's forearm or wrist.

11. The wheelchair device of claim 1, wherein the transmission mechanism further comprises a drive wheel associated with the rotatable reel that is configured to be selectively engaged with and disengaged from a wheelchair wheel of the wheelchair to which the device is mounted, wherein forward movement of the slide member when the drive wheel is engaged with the wheelchair wheel causes the wheelchair wheel to rotate in a forward direction and propel the wheelchair forward.

12. The wheelchair device of claim 11, wherein the drive wheel is mounted to the rotatable reel with a one-way bearing that causes the drive wheel to rotate with the reel when the reel rotates in the first direction but enables the drive wheel to rotate independently of the reel when the reel rotates in the second direction.

13. The wheelchair device of claim 11, wherein the wheelchair device is configured to be operated in a stationary mode in which the drive wheel is disengaged from the wheelchair wheel and a propulsion mode in which the drive wheel is engaged with the wheelchair wheel.

14. The wheelchair device of claim 13, further comprising a mode selection element that can be placed in a first orientation to select the stationary mode and a second orientation to select the propulsion mode.

15. The wheelchair device of claim 14, wherein the transmission mechanism is mounted to a pivotable arm that can be pivoted by the mode selection element to place the drive wheel in engagement or disengagement with the wheelchair wheel.

16. The wheelchair device of claim 11, further comprising a pivotable brake configured to pivot and engage the wheelchair wheel when the slide member is moved backward to a point at which a stop element mounted on the slide member engages the brake.

17. The wheelchair device of claim 1, wherein the frame is adapted to be removably attached to the wheelchair without modification to the wheelchair.

18. The wheelchair device of claim 1, wherein the frame is adapted to replace an armrest of the wheelchair.

19. The wheelchair device of claim 1, further comprising electronics for one or more of sensing usage associated with the wheelchair device, generating usage data, visually providing quantitative feedback to the user, and sending usage data to a remote monitoring portal.

20. A wheelchair comprising:

a wheelchair frame to which are mounted rear wheels, front wheels, and a seat; and a wheelchair device configured to operate in a stationary mode, a propulsion mode, or both, the device including:

a device frame mounted to the wheelchair frame;

a slide member supported by the device frame that is configured to be pushed in a forward direction away from a user of the device with the user's arm;

a transmission mechanism including a rotatable reel and a spring associated with the reel that resists rotation of the reel in a first direction and assists rotation of the reel in a second direction; and a cable having first and second ends, the first end of the cable being attached to the slide member and the second end being attached to the rotatable reel;

wherein movement of the slide member in the forward direction causes the rotatable reel to rotate in the first direction and wherein movement of the slide member in a backward direction opposite to the forward direction causes the rotatable reel to rotate in the second direction.

* * * * *